US010832352B2

(12) United States Patent
Bharti et al.

(10) Patent No.: US 10,832,352 B2
(45) Date of Patent: Nov. 10, 2020

(54) DETERMINING DEMAND RESPONSE IMPACT SCORES AND TARGET CUSTOMER GROUP FOR ENERGY SAVING EVENTS

(71) Applicant: INTERNATIONAL BUSINESS MACHINES CORPORATION, Armonk, NY (US)

(72) Inventors: Harish Bharti, Pune (IN); Anshul Chetal, Haryana (IN); Abhay K. Patra, Pune (IN); Sreeranjini R. Seetharam, Bangalore (IN); Sandeep Sukhija, Sri Ganganagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 810 days.

(21) Appl. No.: 14/925,244

(22) Filed: Oct. 28, 2015

(65) Prior Publication Data

US 2017/0124471 A1 May 4, 2017

(51) Int. Cl.
*G06Q 50/06* (2012.01)
*G06Q 10/06* (2012.01)
*G06N 20/00* (2019.01)

(52) U.S. Cl.
CPC ............. *G06Q 50/06* (2013.01); *G06N 20/00* (2019.01); *G06Q 10/06395* (2013.01)

(58) Field of Classification Search
None
See application file for complete search history.

(56) References Cited

U.S. PATENT DOCUMENTS

| | | | | |
|---|---|---|---|---|
| 2010/0332373 | A1* | 12/2010 | Crabtree | G06Q 40/04 705/37 |
| 2012/0203596 | A1* | 8/2012 | Guthridge | G06Q 10/0637 705/7.37 |
| 2013/0254151 | A1* | 9/2013 | Mohagheghi | H02J 3/14 706/46 |
| 2014/0095410 | A1 | 4/2014 | Chen et al. | |
| 2014/0122181 | A1 | 5/2014 | Fisera et al. | |

(Continued)

*Primary Examiner* — Eric W Stamber
*Assistant Examiner* — Arif Ullah
(74) *Attorney, Agent, or Firm* — William Hartwell; Andrew D. Wright; Roberts Calderon Safran & Cole, P.C.

(57) ABSTRACT

A computer-implemented method includes: receiving, by a computing device, analytics data at a feeder level of a utility transmission and distribution system; generating, by the computing device, a confidence score for a feeder based on the analytics data at the feeder level; receiving, by the computing device, analytics data at a transformer level of the utility transmission and distribution system; generating, by the computing device, a confidence score for a transformer associated with the feeder based on the analytics data at the transformer level and the confidence score of the feeder; receiving, by the computing device, analytics data for customers associated with the transformer; generating, by the computing device, confidence scores for the customers based on the analytics data and the confidence score of the transformer; and outputting, by the computing device, information regarding the confidence scores for the customers for determining the effectiveness of a demand response (DR) program.

19 Claims, 9 Drawing Sheets

(56) References Cited

U.S. PATENT DOCUMENTS

2014/0365264 A1\* 12/2014 Smiley ............ G06Q 10/06315
705/7.25
2015/0186827 A1\* 7/2015 Kwac .................... G06Q 50/06
705/7.25

\* cited by examiner

600

| Feeder_ID | Feeder Name | Factor 1 Value | Factor 2 Value | Cluster |
|---|---|---|---|---|
| 1 | Feeder1 | 9 | 13 | 1 |
| 2 | Feeder2 | 9 | 12 | 1 |
| 3 | Feeder3 | 9 | 12 | 1 |
| 4 | Feeder4 | 6 | 11 | 2 |
| 5 | Feeder5 | 4 | 14 | 2 |

FIG. 6

| Transformer_ID | Transformer Name | Factor 1 Value | Factor 2 Value | Feeder Cluster | Transformer Cluster |
|---|---|---|---|---|---|
| 1 | Transformer1 | 6 | 11 | 1 | 1 |
| 2 | Transformer2 | 9 | 13 | 1 | 2 |
| 3 | Transformer3 | 8 | 11 | 2 | 3 |
| 4 | Transformer4 | 8 | 13 | 3 | 1 |
| 5 | Transformer5 | 7 | 12 | 2 | 2 |
| 6 | Transformer6 | 5 | 13 | 3 | 3 |
| 7 | Transformer7 | 6 | 14 | 1 | 1 |

| Customer_ID | Customer Name | Factor 1 Value | Factor 2 Value | Factor 3 | Transformer Score | Feeder Score |
|---|---|---|---|---|---|---|
| 1 | Customer 1 | 30243 | Doctor | Y | 1 | 2 |
| 2 | Customer 2 | 35481 | Teacher | Y | 2 | 1 |
| 3 | Customer 3 | 20392 | Engineer | Y | 1 | 1 |
| 4 | Customer 4 | 65519 | Doctor | Y | 1 | 2 |
| 5 | Customer 5 | 25507 | Teacher | N | 2 | 3 |
| 6 | Customer 6 | 45557 | Engineer | N | 2 | 2 |
| 7 | Customer 7 | 45219 | Doctor | Y | 3 | 3 |
| 8 | Customer 8 | 95657 | Teacher | Y | 1 | 3 |
| 9 | Customer 9 | 94706 | Engineer | Y | 3 | 2 |
| 10 | Customer 10 | 87746 | Doctor | Y | 2 | 2 |

850 ⟶

| Customer_ID | Customer Name | Impact Score |
|---|---|---|
| 1 | Customer 1 | 0.17 |
| 2 | Customer 2 | 0.81 |
| 3 | Customer 3 | 0.45 |
| 4 | Customer 4 | 0.32 |
| 5 | Customer 5 | 0.98 |
| 6 | Customer 6 | 0.87 |
| 7 | Customer 7 | 0.45 |
| 8 | Customer 8 | 0.21 |
| 9 | Customer 9 | 0.75 |
| 10 | Customer 10 | 0.65 |

FIG. 8

DETERMINING DEMAND RESPONSE IMPACT SCORES AND TARGET CUSTOMER GROUP FOR ENERGY SAVING EVENTS

BACKGROUND

The present invention generally relates to utility demand response (DR) techniques, and more particularly, to the generation of confidence scores for utility demand response.

Demand response (DR) in the utility industry is a load management tool which provides a cost-effective alternative to traditional supply-side solutions to address the growing demand during times of peak electrical load. While DR techniques help curb and manage utility load, implementing DR techniques is costly from the business, information technology and infrastructure prospective.

Because DR techniques can be costly to implement, the effectiveness and impact of DR programs, e.g., energy savings programs, should be accurately measured. Traditionally, the effectiveness of DR programs is measured through the study of load curve and demand management analysis. However such analysis fail to consider highly influencing factors and variables that include customer predictive factors, limitations of transmission and distribution networks, grid hierarchy, etc.

SUMMARY

In an aspect of the invention, a computer-implemented method includes: receiving, by a computing device using an application program interface (API), analytics data at a feeder level of a utility transmission and distribution system; generating, by the computing device, a confidence score for a feeder based on the analytics data at the feeder level; receiving, by the computing device using the API, analytics data at a transformer level of the utility transmission and distribution system; generating, by the computing device, a confidence score for a transformer associated with the feeder based on the analytics data at the transformer level and the confidence score of the feeder; receiving, by the computing device using the API, analytics data for customers associated with the transformer; generating, by the computing device, confidence scores for the customers based on the analytics data and the confidence score of the transformer; and outputting, by the computing device, information regarding the confidence scores for the customers for determining the effectiveness of a demand response (DR) program. In a further aspect of the invention, the confidence scores of the customers indicate a likelihood of customer participation in the DR program, or an estimated amount of energy saved by the customers during the DR program. In a further aspect of the invention, the method further includes selecting a group of customers for participation in the DR program based on the confidence scores of the customers.

In another aspect of the invention, there is a computer program product for determining an effectiveness of a demand response (DR) program. The computer program product includes a computer readable storage medium having program instructions embodied therewith. The program instructions are executable by a computing device to cause the computing device to: determine an effectiveness of the demand response (DR) program based on analytics information of a hierarchy of a utility transmission and distribution system, and analytics information of customers associated with the utility transmission and distribution system, where the analytics information of the hierarchy of a utility transmission and distribution system and the analytics information of the customers is obtained using an application program interface (API); determine confidence scores for the customers based on the analytics information of the hierarchy of a utility transmission and distribution system and the analytics information of the customers associated with the utility transmission and distribution system; and determine a target set of customers for which to select to participate in the DR program. In a further aspect of the invention, the confidence scores of the customers indicate a likelihood of customer participation in the DR program, or an estimated amount of energy saved by the customers during the DR program. In a further aspect of the invention, the program instructions further cause the computing device to send a message to the target set of customers to notify the target set of customers of the DR program.

In another aspect of the invention, a system includes a CPU, a computer readable memory and a computer readable storage medium associated with a computing device; program instructions to receive information regarding confidence scores associated with a feeder, a transformer associated with the feeder, and customers associated with the transformer, wherein the confidence score for the transformer is based on the confidence score for the feeder, and the confidence scores for the customers are based on the confidence score for the transformers, wherein the information is received via an application programming interface (API); program instructions to select a particular group of the customers for participation in a demand response (DR) program based on the confidence scores of the customers; program instructions to determine rewards for the customers as part of the DR program; and program instructions to output a message to the group of customers to notify the customers regarding the selection of the group of customers for the participation in the DR program. The program instructions are stored on the computer readable storage medium for execution by the CPU via the computer readable memory. In a further aspect of the invention, the system further comprises program instructions to determine potentially an estimated amount of energy to purchase based on the confidence scores of the feeder, the transformer, or the customers.

BRIEF DESCRIPTION OF THE DRAWINGS

The present invention is described in the detailed description which follows, in reference to the noted plurality of drawings by way of non-limiting examples of exemplary embodiments of the present invention.

FIGS. 6-8 show example data structures for segmenting and scoring different levels of a utility transmission and distribution system in accordance with aspects of the present invention.

DETAILED DESCRIPTION

Figure 1:
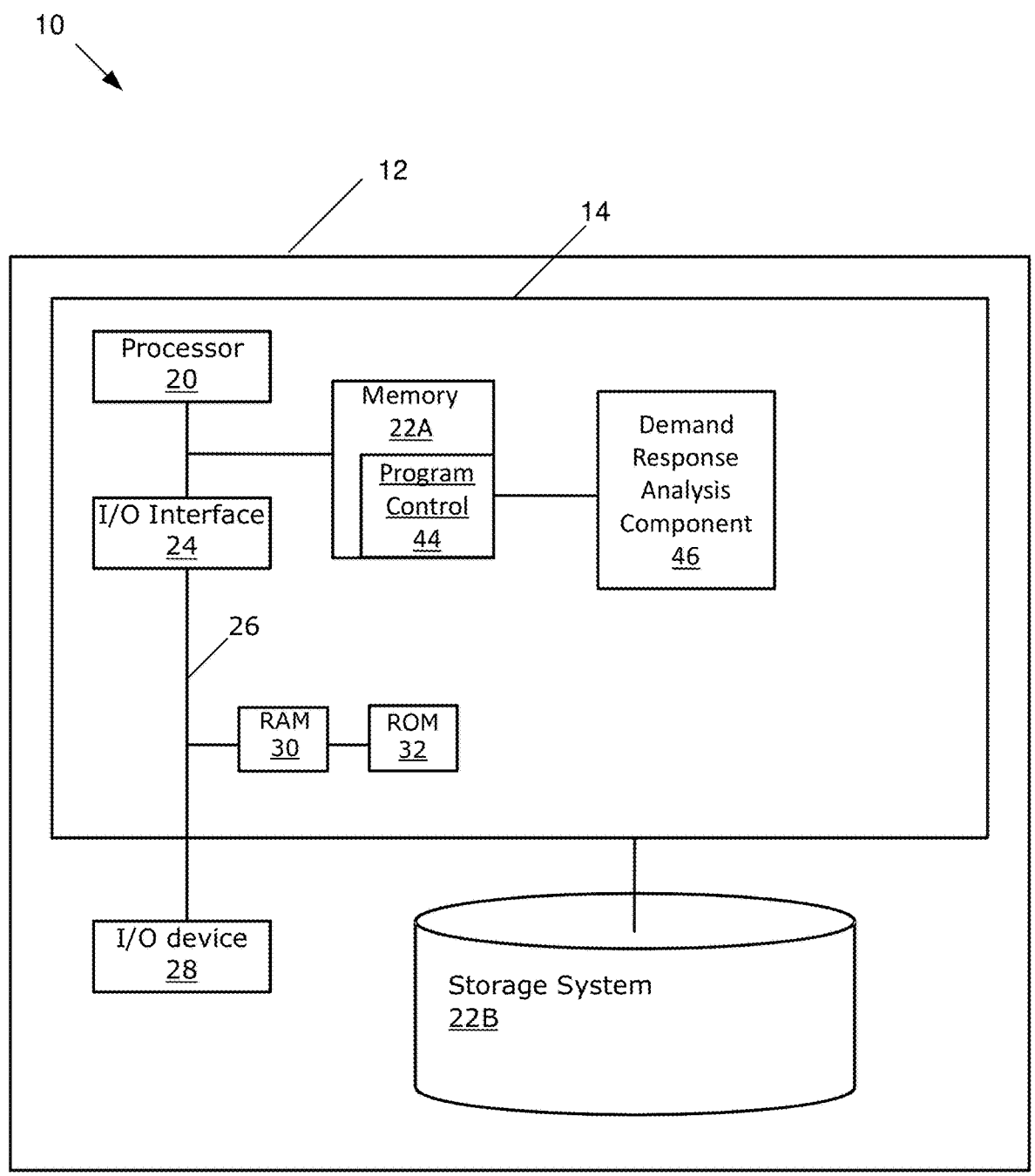
FIG. 1 an illustrative environment for implementing the steps in accordance with aspects of the invention.

The present invention generally relates to utility demand response techniques, and more particularly, to the generation of confidence scores for utility demand response. In accordance with aspects of the present invention, confidence scores are generated to assist a utility provider in identifying portions of a utility transmission and distribution network for which to focus the implementation of demand response (DR) programs and/or energy savings efforts. Further, the confidence scores can be used to derive a target set of customers for a DR program. For example, the confidence scores can identify a group of customers for a DR program that will most greatly impact (e.g., reduce) energy usage, particularly at peak energy usage times. In embodiments, the confidence scores may identify those customers that are most likely to participate in a DR program, and further, those customers that will have the most impact on the DR program. In an alternative embodiment, the confidence scores may identify a projected demand at various levels in the distribution system hierarchy. Further, the confidence scores may be used to identify how this demand is to sought to be channeled by the right supply lines to consumers who may have multiple routes to receive electricity.

Advantageously, aspects of the present invention improve the effectiveness and impact of DR programs. As described herein, aspects of the present invention solve the technical problem of selecting a customer group for a DR program based on customer predictive usage patterns, limitations of transmission and distribution networks, grid hierarchy, and/or other factors. Further, aspects of the present invention solve the technical problem of generating a confidence score (e.g., a confidence, effectiveness, or propensity score) for DR programs.

Confidence scores can be generated at various levels of a utility system hierarchy (e.g., at the feeder level, transformer level, and customer level). The confidence scores indicate the expected value of a DR program at each level in the utility system. As described herein, confidence scores generated at higher levels (e.g., at feeder and transformer levels) are used to generate confidence score at lower levels (e.g., at the customer level). Confidence scores at the customer levels may indicate the expected value of a DR program for the customers. For example, a relatively higher confidence score indicates that a customer is more likely to participate in a DR program, and that the customer's impact for participating in the DR program is relatively high (e.g., will generate substantial energy and cost savings). As described herein, customer behavioral analysis and customer analytics data is used to determine a customer's confidence score. The behavioral analysis can improve the accuracy of the confidence score, and thus improve the prediction accuracy of whether the customer will choose to participate in a DR program. In alternative embodiments, the confidence score may also predict the customer's impact when participating in the DR program (e.g., an amount of energy that the customer saves during a time period corresponding to the DR program).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26.

The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM) 30, a read-only memory (ROM) 32, and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a demand response analysis component 48, e.g., the processes described herein. The demand response analysis component 48 can be implemented as one or more program code in program control 44 stored in memory 22A as separate or combined modules. Additionally, the demand response analysis component 48 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
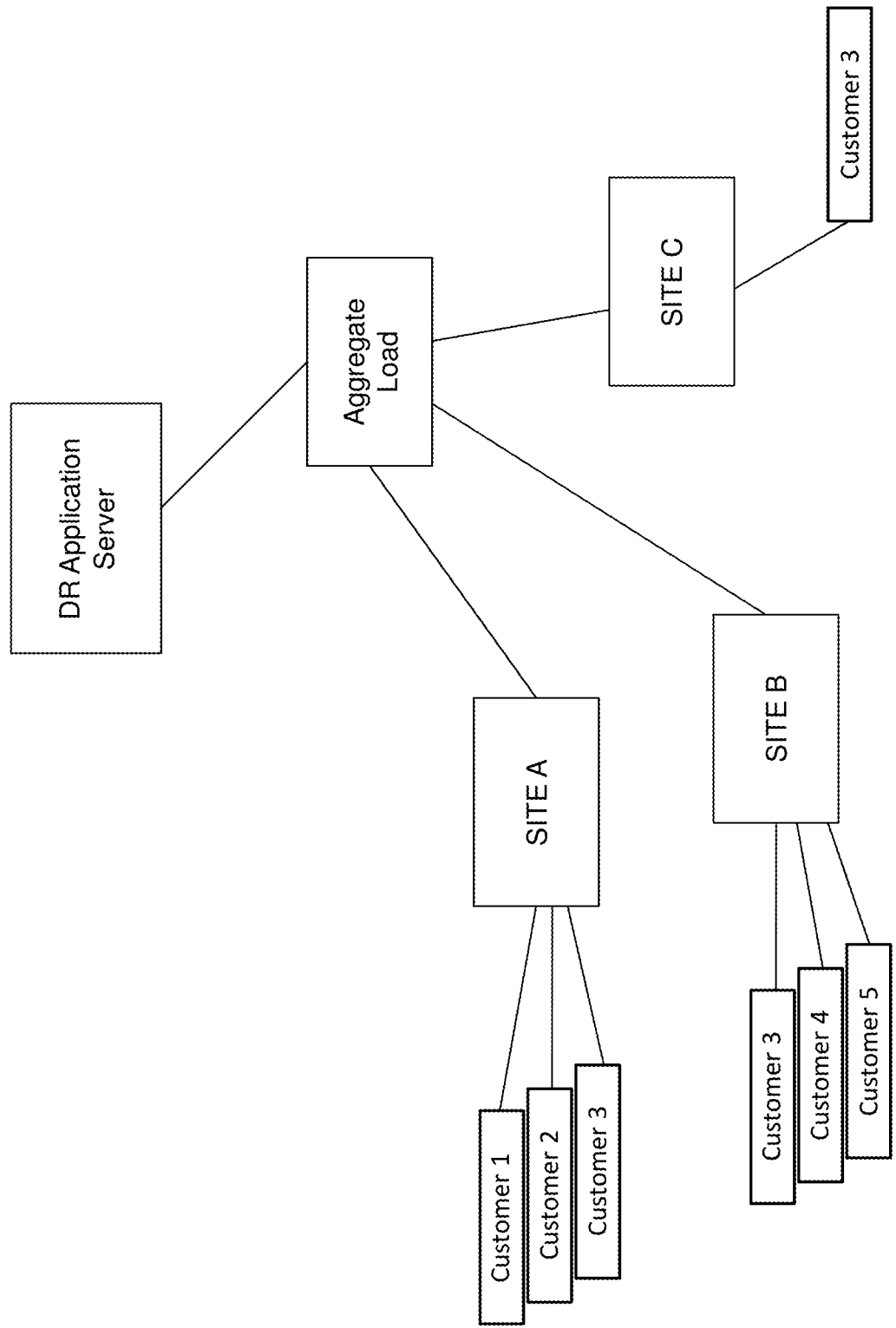
FIG. 2 shows an overview of an example implementation in accordance with aspects of the present invention

FIG. 2 shows an overview of an example utility transmission and distribution network in accordance with aspects of the present invention. As shown in FIG. 2, various customers of a utility transmission and distribution network are connected to various sites, e.g., transformers and feeders. A particular customer may be associated with multiple sites. Load information from each customer is aggregated from the customer level up to the site level. The aggregate load information can be used to generate DR confidence scores, and the DR confidence scores are received by a DR application server. As described in greater detail herein, the DR confidence score may be used to select a target set of customers for a DR program, determine energy savings incentives for a DR program, and/or analyze the impact of a DR program. Additionally, or alternatively, the DR confidence score may be used by a utility provider to make energy supply purchasing decisions, e.g., by purchasing energy in advance at a particular price, e.g., a "spot" price.

Figure 3:
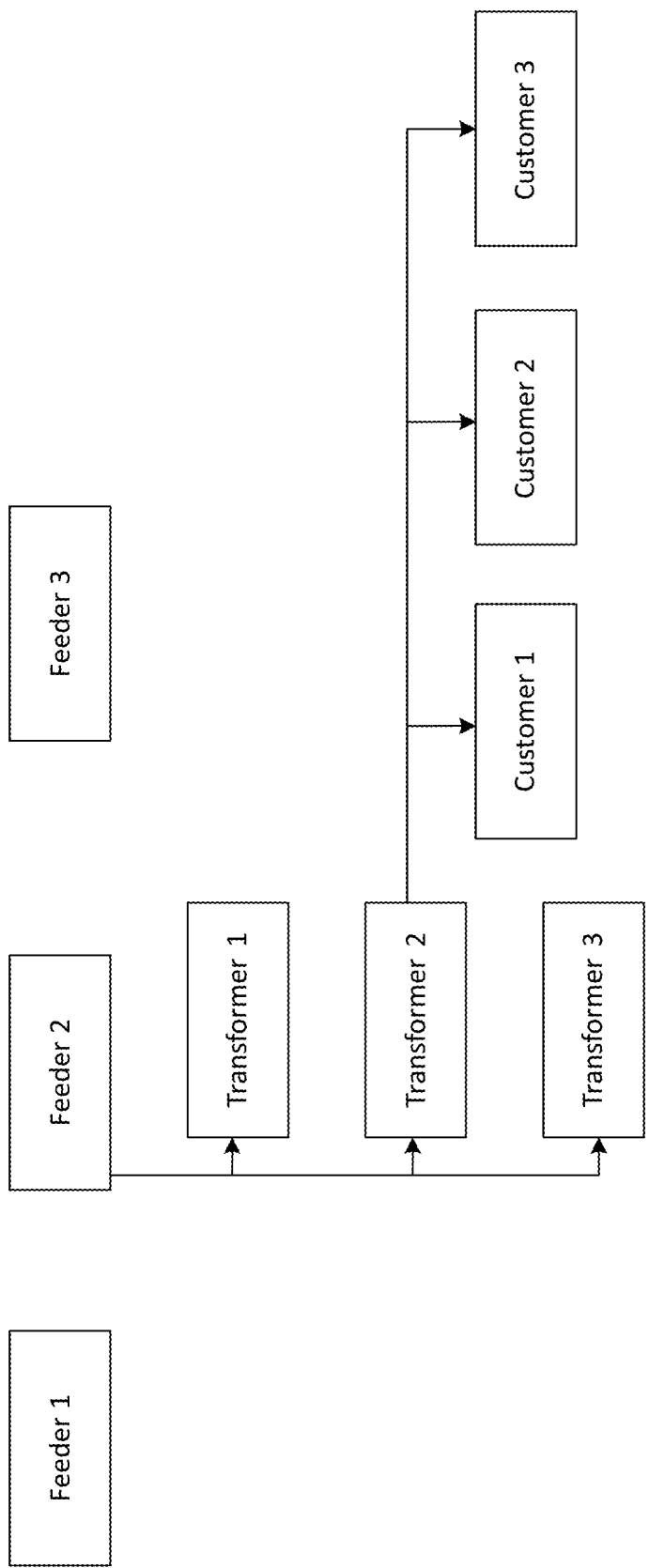
FIG. 3 shows an example hierarchy of utility transmission and distribution in accordance with aspects of the present invention.

FIG. 3 shows an overview of an example utility transmission and distribution network in accordance with aspects of the present invention. As shown in FIG. 3, a utility transmission and distribution network may be structured in a hierarchal manner, with the top level of the utility transmission and distribution network including feeders. Each feeder distributes energy to one or more transformers, and each transform then distributes the energy to individual customers. In the illustrative example of FIG. 3, Feeder 2 is connected to three transformers, e.g., transformer 1, 2, and 3. Transformer 2 is connected to three customers, e.g., customers 1, 2, and 3. The feeders, transformers, and customers may be grouped based on their geographic locations. Additionally, or alternatively, the feeders, transformers, and customers may be grouped based on some other factors.

Figure 4:
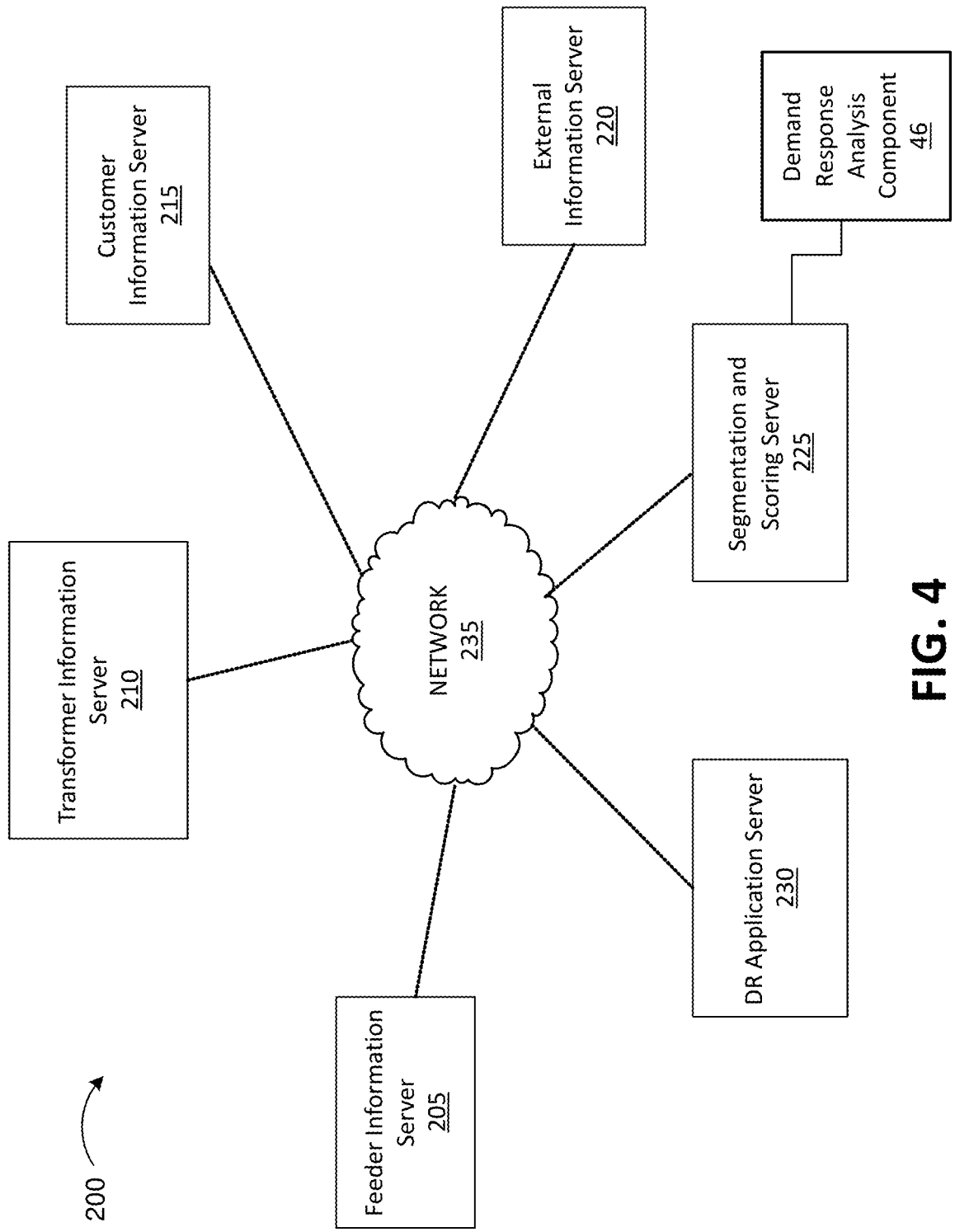
FIG. 4 shows an example environment in accordance with aspects of the present invention.

FIG. 4 shows an example environment in accordance with aspects of the present invention. As shown in FIG. 4, environment 200 may include a feeder information server 205, a transformer information server 210, a customer information server 215, an external information server 220, a segmentation and scoring server 225, a DR application server 230, and/or a network 235.

The feeder information server 205 may include one or more computing devices that receive and/or store information regarding feeders in a utility transmission and distribution system. The feeder information server 205 may store analytics data regarding the feeders at the feeder level, such as energy cost per unit, estimated revenue per customer category (e.g., commercial, residential, government customers, etc.), power loss ratios, load balancing data, historical DR response program participation data at the feeder level, etc. As described in greater detail herein, the segmentation and scoring server 225 may use this analytics data to segment or group feeders together and to select "high impact" feeders for a DR program. Further, the segmentation and scoring server 225 may use the analytics data to generate confidence scores at the feeder level.

The transformer information server 210 may include one or more computing devices that receive and/or store information regarding transformers in a utility transmission and distribution system. The transformer information server 210 may store analytics data regarding the transformers at the transformer level, such as power loss ratios, load balancing data, historical DR response program participation data at the transformer level, etc. As described in greater detail herein, the segmentation and scoring server 225 may use this analytics data to segment or group transformers together and to select "high impact" transformers a DR program. Further, the segmentation and scoring server 225 may use the analytics data to generate confidence scores at the transformers level. The confidence score at the transformer level may also take into account the confidence score of a parent feeder associated with the transformer.

The customer information server 215 may include one or more computing devices that receive and/or store information regarding customers in a utility transmission and distribution system. More specifically, the customer information server 215 may store analytics information that may be used to determine the confidence score for each customer. The confidence score for each customer indicates a predicted (e.g., an expected) impact that a customer would have for a DR program. For example, the confidence score for a customer indicates a likelihood that the customer would participate in a DR program, and the customer's impact (e.g., energy/cost savings) for participating in the DR program. In embodiments, the customer information server 215 stores customer analytics information, such as family income, number of family members, profession, customer category (commercial, residential, government, private, etc.), number of appliances (e.g., heating ventilation air conditioning (HVAC) systems, previous DR program participation/satisfaction data, DR program registration status, customer participation in environmental conservation programs, participation in related discount programs, etc.

The external information server 220 may include one or more computing devices that receives and/or stores analytics data regarding events and/or other external factors that may affect a confidence score. For example, the external information server 220 may store information regarding events (e.g., holidays, festivals, or the like), and the potential energy impact of these events. As described herein, the generation of confidence scores may take into consideration planned future events. As an illustrative example, a particular event or holiday may indicate a predicted energy usage for customers of a particular nationality or religion. The confidence score may be lower for these customers who are less likely to participate in an energy savings or DR program during times of the event.

The segmentation and scoring server 225 may include one or more computing devices that calculate confidence scores for various levels in a utility system. In embodiments, the segmentation and scoring server 225 may receive analytics data for different levels of the utility system, e.g., from the feeder information server 205, the transformer information server 210, and the customer information server 215. Also, the segmentation and scoring server 225 may receive analytics data, e.g., data relating to events, from the external information server 220. The segmentation and scoring server 225 may determine confidence scores at the feeder level based on the analytics data relating to the feeders. In embodiments, the segmentation and scoring server 225 may use an application program interface (API) to request and receive the analytics data from the feeder information server 205, the transformer information server 210, and/or the customer information server 215.

The segmentation and scoring server 225 may further cluster or segment a group of feeders. The segmenting of the feeders may assist in identifying low, medium, and high importance/impact feeders for targeting, e.g., for a DR program. Similarly, the segmentation and scoring server 225 may determine confidence scores at the transformer level based on the analytics data relating to the transformers. Also, the segmentation and scoring server 225 may determine the confidence scores for the transformers based on the scores of the parent feeders. In embodiments, the segmentation and scoring server 225 may segment or cluster the transformers to identify low, medium, and high importance/impact transformers for targeting, e.g., for a DR program. The segmentation and scoring server 225 may further determine a confidence scores at the customer level based on the analytics data associated with the customers. The confidence scores for each customer may be based on the confidence scores for the parent transformers. Since the confidence scores for parent transformers have been determined based on confidence scores for parent feeders, the confidence scores for each customer is therefore based on the confidence scores of higher level transformers and feeders. In embodiments, the segmentation and scoring server 225 may generate the confidence scores to effectively prioritize the offering of DR programs to customers having the highest confidence scores.

The DR application server 230 may include one or more computing devices that receive confidence scores from the segmentation and scoring server 225. Based on these confidence scores, the DR application server 230 may determine a target set of customers for which to offer a DR program (e.g., by selecting the customers whose confidence scores exceed a threshold). Additionally, or alternatively, the DR application server 230 may determine an amount or type of energy savings rewards for the customers (e.g., a discount or credit per unit of energy saved). Additionally, or alternatively, the DR application server 230 may determine that the utility provider should purchase energy in advance from a supplier at a spot price. In embodiments, the DR application server 230 may determine when to implement a DR program based on factors such as market clearing electricity price, reliability factors, current load, load prediction techniques, and/or confidence scores.

The network 235 may include network nodes. Additionally, or alternatively, the network 235 may include one or more wired and/or wireless networks. For example, the network 235 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 235 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 4. In practice, the environment 200 may include additional devices and/or networks; fewer devices and/or networks; different devices and/or networks; or differently arranged devices and/or networks than illustrated in FIG. 4. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 5:
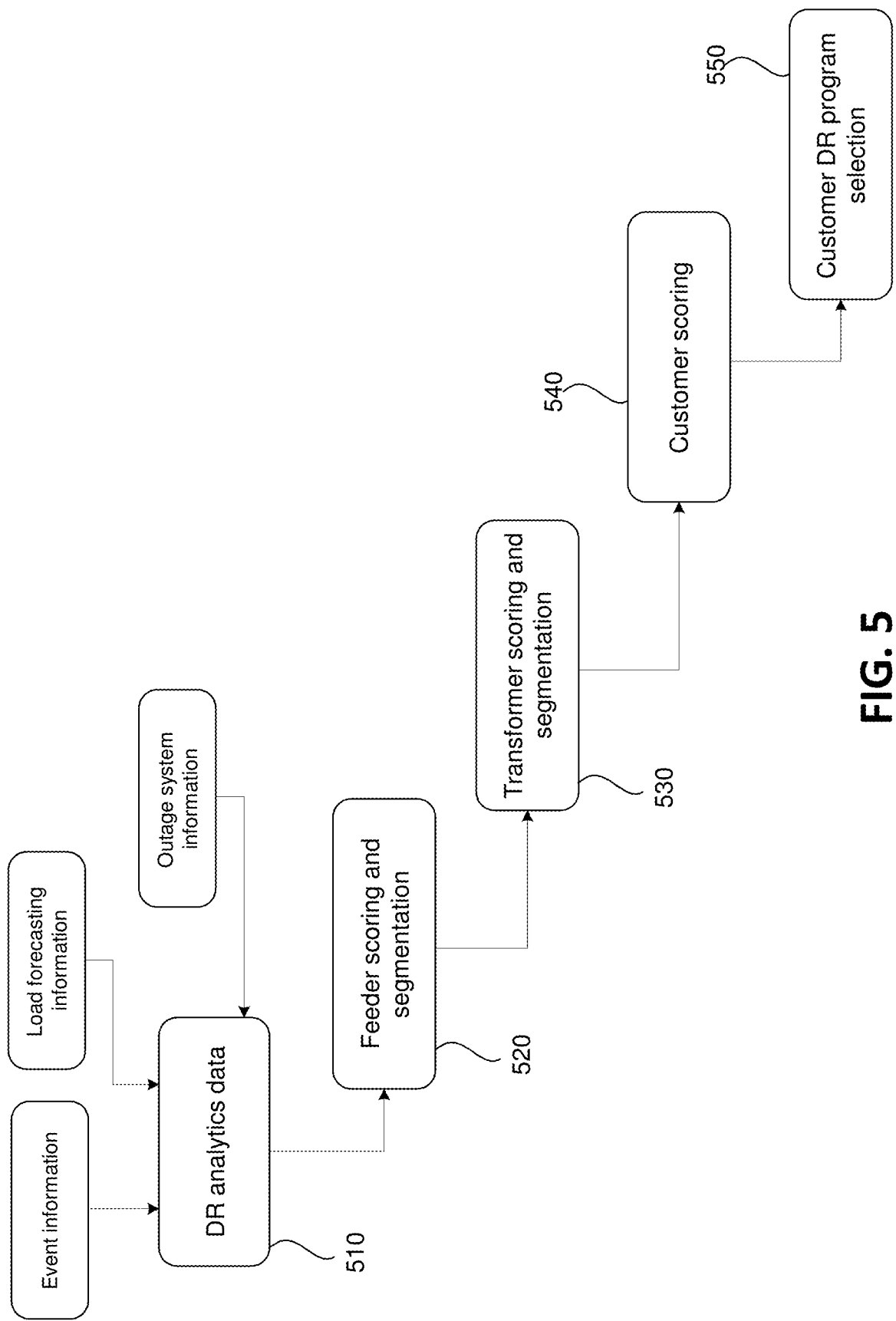
FIG. 5 shows an example flowchart for generating confidence scores at different levels of hierarchy in a utility transmission and distribution system in accordance with aspects of the present invention.

FIG. 5 shows an example flowchart for generating confidence scores at various levels of a utility system in accordance with aspects of the present invention. The steps of FIG. 5 may be implemented in the environments of FIGS. 1-4, and are described with reference to elements illustrated in those figures, for example. As noted above, the flowchart illustrates the architecture, functionality, and operation of possible implementations of systems, methods, and computer program products according to various embodiments of the present invention.

At step 510, DR analytics data is received. For example, the segmentation and scoring server 225 may receive external DR analytics data from the external information server 220, such as event information. Also, the segmentation and scoring server 225 may receive, e.g., from the feeder information server 205, the transformer information server 210, and/or the customer information server 215, load forecasting information, outage system information, and/or other analytics information relating to the feeder, transformer, and customer levels.

At step 520, the feeders are scored and segmented. For example, the segmentation and scoring server 225 may generate a confidence score for the feeders based on feeder-level analytics data/factors received from the feeder information server 205 and/or external information server 220. In some implementations, the analytics data may be normalized on a scale, e.g., a scale of 1-100 or other scale. Alternatively, the analytics data may simply be raw data values. The analytics data may be weighted so that factors that are considered to be more important for generating the confidence score are more heavily weighted. If a particular factor is not required for a particular analysis technique, that factor may be given a score of zero.

As an illustrative example, factors for generating the confidence score for a feeder may include:

Cost per unit of energy at the feeder level. Since each feeder is located at a different geographical location, the cost per unit is different at each feeder. The unit cost proportionally affects the feeder's confidence score (e.g., feeders with relatively higher unit costs would have relatively higher confidence scores).

Estimated revenue at the feeder level based on category type (e.g., feeders for commercial, residential, government or private customers). The estimated revenue may have an inverse effect on the confidence score for the feeder.

Transmission power loss ratios at the feeder level. The transmission power loss ratio may proportionally affect the feeder's confidence score (e.g., feeders with relatively higher transmission power loss ratios would have relatively higher confidence scores since reducing energy transmission from these feeders would more greatly reduce overall energy usage).

Load balancing forecasting at the feeder level. The load forecasting at the feeder level may be analyzed based on event data (received at step 510), peak load times, etc. The load balancing may proportionally affect the feeder's confidence score (e.g., feeders having relatively higher load balancing would have relatively higher confidence scores).

Historical DR program participation data at the feeder level. This may include a number or proportion of customers who have historically participated in DR programs of particular types (e.g., peak load DR programs, DR programs held based on the occurrence of particular events, etc.). The DR program participation rate may proportionally affect the feeder's confidence score (e.g., feeders with a relatively higher DR participation rate would have relatively higher confidence scores).

As described in greater detail herein, the feeders may be segmented into clusters based on the feeder scores and/or other factors that indicate the level of importance for targeting feeders for a DR program. Advantageously, feeders in the highest impact clusters may be selected for a DR program. Feeders may be clustered using any number of known clustering techniques, including unsupervised learning models.

At step 530 the transformers are scored and segmented. For example, the segmentation and scoring server 225 may generate a confidence score for the transformers based on transformer-level analytics data/factors received from the transformer information server 210 and/or external information server 220. In some implementations, the analytics data may be normalized on a scale, e.g., a scale of 1-100 or other scale. Alternatively, the analytics data may simply be raw data values. The analytics data may be weighted so that factors that are considered to be more important for generating the confidence score are more heavily weighted.

As an illustrative example, factors for generating the confidence score for a transformer may include:

Confidence score of the parent feeder associated with the transformer. For example, the confidence score for the parent feeder, as determined at step 520, proportionally affects the transformer's confidence score (e.g., transformers with relatively higher parent feeder scores would have relatively higher confidence scores).

Cost per unit of energy at the transformer level. Since each transformer is located at a different geographical location, the cost per unit is different at each transformer. The unit cost proportionally affects the transformer's confidence score (e.g., transformers with relatively higher unit costs would have relatively higher confidence scores).

Estimated revenue at the transformer level based on category type (e.g., transformers for commercial, residential, government or private customers). The estimated revenue may have an inverse effect on the confidence score for the transformer.

Transmission power loss ratios at the transformer level. The transmission power loss ratio may proportionally affect the transformer's confidence score (e.g., transformers with relatively higher transmission power loss ratios would have relatively higher confidence scores since reducing energy transmission from these transformers would more greatly reduce overall energy usage).

Load balancing forecasting at the transformer level. The load forecasting at the transformer level may be analyzed based on event data (received at step 510), peak load times, etc. The load balancing may proportionally affect the transformer's confidence score (e.g., transformers having relatively higher load balancing would have relatively higher confidence scores).

Historical DR program participation data at the transformer level. This may include a number or proportion of customers who have historically participated in DR programs of particular types (e.g., peak load DR programs, DR programs held based on the occurrence of particular events, etc.). The DR program participation rate may proportionally affect the transformer's confidence score (e.g., transformers with a relatively higher DR participation rate would have relatively higher confidence scores).

As described in greater detail herein, the transformers may be segmented into clusters based on the transformer scores and/or other factors that indicate the level of importance for targeting transformers for a DR program. Advantageously, transformers in the highest impact clusters may be selected for a DR program. In embodiments, the transformers associated with a parent feeder of a selected cluster may be scored and clustered so that only the transformers associated with high impact feeders are selected for a DR program.

At step 540, confidence scores for customers are generated. For example, the segmentation and scoring server 225 may generate a confidence score for the customers based on customer-level analytics data/factors received from the customer information server 215 and/or external information server 220. In some implementations, the analytics data may be normalized on a scale, e.g., a scale of 1-100 or other scale. Alternatively, the analytics data may simply be raw data values. The analytics data may be weighted so that factors that are considered to be more important for generating the confidence score are more heavily weighted.

As an illustrative example, factors for generating the confidence score for a customer may include:

Parent feeders and transformer segmentation data and scores. Information regarding the parent feeders and transformer segmentation data and scores proportionally affects the confidence score of the customer so that customers from the highest impact parent transformers and feeders have higher confidence scores.

Number of earners in the customer's family. Information regarding the number of earners in the customer's family may inversely proportionally affect the confidence score based on behavioral data indicating that families with fewer earners are more likely to participate in a DR program.

Total income of a customer's family. Information regarding the total income of the customer's family may inversely proportionally affect the confidence score based on behavioral data indicating that families with lower incomes are more likely to participate in a DR program.

Customer's profession. Information regarding the customer's profession may affect the confidence score based on behavioral data indicating that individuals of certain professions are either more likely or less likely to respond or participate in DR programs.

Customer category (e.g., commercial, resident, government, private, etc.). Information regarding the customer's category may affect the confidence score based on behavioral data indicating that customers of certain categories are either more likely or less likely to respond or participate in DR programs.

Customer interests. Information regarding the customer's interests may indicate the likelihood that the customer may respond or participate in certain DR programs, such as DR programs related to particular events/holidays.

Customer's historical energy usage and temperature preferences. Information regarding the customer's historical energy usage and temperature preferences may indicate how likely the customer is willing to participate in a DR program at different periods of time, as well as the customer's potential impact when participating the DR program.

Customer's net energy metering (NEM) rating. Information regarding the customer's net energy metering rating may proportionally affect the customer's confidence score by indicating how energy conscious the customer is. For example, a relatively higher NEM rating may translate into a relatively higher confidence score.

Customer's preference status for participating in DR programs. Information regarding the customer's preference status for participating in DR programs affect the confidence score by indicating how likely the customer is to participate in the DR program.

Customer's participation in environmental conservation related programs (e.g., Earth Day programs or other environmental conservation events). Information regarding the customer's participation in environmental conservation related programs may indicate the customer's interest in participating in a DR program, and hence, affect the confidence score for the customer. Information regarding the customer's participation in environmental conservation related programs can be obtained from a customer profile, the customer's calendar, the customer's social media profile, etc.

Customer's participation in promotional programs. Information regarding the customer's participation in promotional programs (whether these promotional programs are related to energy savings or not) may indicate the likelihood that the customer would participate in a DR program. For example, behavioral data may suggest that customers that participate in promotional programs (e.g., sales events, etc.) may be more likely to participate in a DR program.

Customer's ratings and/or participation for previous DR programs of various types. For example, after the occurrence of a DR program, the customer's participation and/or feedback ratings from these programs can be used in the calculation of the confidence score (e.g., since the customer's participation and/or feedback ratings may indicate the customer's interest and likelihood for participating in future DR programs).

In embodiments, other variables/factors may be considered when determining the DR scores for customers. In embodiments, user defined variables may be used.

At step 550 customers are selected for participation in a DR program. For example, the segmentation and scoring server 225 and/or DR application server 230 may select those customers from the highest impact parent transformers and feeders and whose customer confidence scores exceed a particular threshold. As described herein, the selected customers may receive messages notifying them of the DR program and of potential rewards for participation the DR program (e.g., billing credits for reducing the amount of energy consumed at particular times). Additionally, or alternatively, the DR application server 230 may use the confidence scores (e.g., the scores at feeder, transformer, and/or customer level) to aid in an energy purchase analysis for a utility provider.

FIG. 6 shows an example data structure of feeder segmentation data in accordance with aspects of the present invention. As shown in FIG. 6, the data structure 600 may store information identifying individual feeders in a utility transmission and distribution system. Further, data structure 600 may store analytics data for different factors at the feeder level, such as those factors discussed above with respect to FIG. 5 (e.g., such as energy cost per unit, estimated revenue per customer category (e.g., commercial, residential, government customers, etc.), power loss ratios, load balancing data, historical DR response program participation data at the feeder level, etc.). In FIG. 6, values for two factors are shown for clarity and simplicity. For example, factor 1 and factor 2 may correspond to any one of those factors previously discussed. The values may be normalized on a scale, or may simply be raw values. As should be understood, the information stored in the data structure 600 is for illustrative purposes only, and the data structure 600 may store analytics data for any number of feeders and any number of factors. Also, data structure 600 may store information regarding the feeders, such as their geographic location.

Information stored in the data structure 600 may be used to segment the feeders into clusters, and those clusters can then be assigned with a designation indicating their importance or impact levels. Feeders in clusters with relatively high importance may be selected for a DR program, and as further described herein, transformers associated with the feeders in a selected cluster can then be clustered and assigned with a designation indicating their importance or impact levels. Those transformer clusters with considered to be of high impact are then selected for a DR program, and customers associated with the selected transformer clusters are then scored.

To segment the feeders into clusters, a k-means segmentation process can be used. For example, an arbitrary number of k clusters can be selected, e.g., two. Data is then partitioned into k clusters. The assignment of training samples can be random or systemic. Initial values of a centroid are chosen (e.g., Cluster 1=(9, 13) and Cluster 2=(4, 14)). Each object is assigned to the cluster with the nearest centroid. The distance between the cluster and centroid to each object is determined using the Euclidean Distance formula. If a sample is not currently in the cluster with the closest centroid, the sample is switched to that cluster, and the centroid of the cluster gaining the new sample and cluster losing the sample is updated. The distance calculation and centroid computation is repeated until convergence is achieved, e.g., until a pass through the training sample causes no new assignments. In alternative embodiments, other known segmentation and clustering techniques can be used to cluster the feeders. Advantageously, the feeders are clustered in a manner that identifies a level of impact or importance, and higher impact clusters may be targeted or selected for a DR program.

FIG. 7 shows an example data structure of transformer segmentation data in accordance with aspects of the present invention. As shown in FIG. 7, the data structure 700 may store information identifying individual transformers in a utility transmission and distribution system, as well as feeder clusters associated with the transformers (e.g., based on the feeder clustering described above with respect to FIG. 6). Further, data structure 700 may store analytics data for different factors at the transformer level, such as those factors discussed above with respect to FIG. 5 (e.g., such as energy cost per unit, estimated revenue per customer category (e.g., commercial, residential, government customers, etc.), power loss ratios, load balancing data, historical DR response program participation data at the transformer level, etc.).

In FIG. 7, values for two factors are shown for clarity and simplicity. For example, factor 1 and factor 2 may correspond to any one of those factors previously discussed. The values may be normalized on a scale, or may simply be raw values. As should be understood, the information stored in the data structure 700 is for illustrative purposes only, and the data structure 700 may store analytics data for any number of transformers and any number of factors. Also, data structure 700 may store information regarding the transformers, such as their geographic location.

Information stored in the data structure 700 may be used to segment the transformers into clusters, and those clusters can then be assigned with a designation indicating their importance or impact levels. To segment the transformers into clusters, a k-means segmentation process can be used. For example, an arbitrary number of k clusters can be selected, e.g., two. Data is then partitioned into k clusters. The assignment of training samples can be random or systemic. Initial values of a centroid are chosen. Each object is assigned to the cluster with the nearest centroid. The distance between the cluster and centroid to each object is determined using the Euclidean Distance formula. If a sample is not currently in the cluster with the closest centroid, the sample is switched to that cluster, and the centroid of the cluster gaining the new sample and cluster losing the sample is updated. The distance calculation and centroid computation is repeated until convergence is achieved, e.g., until a pass through the training sample causes no new assignments. In alternative embodiments, other known segmentation and clustering techniques can be used to cluster the transformers. Advantageously, the transformers are clustered in a manner that identifies a level of impact or importance, and higher impact clusters may be targeted or selected for a DR program.

FIG. 8 shows an example data structure of customer impact scoring data in accordance with aspects of the present invention. As shown in FIG. 8, the data structure 800 may store information identifying individual customers in a utility transmission and distribution system, as well as feeder scores and transformer scores associated with the customers. Further, data structure 800 may store analytics data for different factors at the customer level, such as those factors discussed above with respect to FIG. 5.

In FIG. 8, values for two factors are shown for clarity and simplicity. For example, factor 1 and factor 2 may correspond to any one of those factors previously discussed. The values may be normalized on a scale, or may simply be raw values or as qualitative descriptions. For example, a number corresponding to the customer's household income may be stored in the data structure 800. Also, a qualitative description of the customer's occupation may be stored in the data structure 800 (e.g., doctor, teacher, engineer, etc.). As should be understood, the information stored in the data structure 800 is for illustrative purposes only, and the data structure 800 may store analytics data for any number of customers and any number of factors.

Information stored in the data structure 800 may be used to generate confidence scores for each customer. For example, data in the data structure 800 may be pre-processed for the development of a model, e.g., ensemble modeling, a logistic regression model, a decision tree, a neural network, etc. Using the models, the confidence score can be generated via majority voting, weighted voting, weighted averages, etc. Further, the feeder scores and transformer scores are variables that are also used in determining the confidence scores for the customers. The confidence score for the customers are then stored, e.g., in the data structure 850. Customers whose confidence scores exceed a threshold may then be selected for an invitation for a DR program (e.g., as indicated in the highlighted portions of the data structure 850). In an example, the confidence score may be a value on a scale from 0-1, although the confidence score may be on any other scale. Advantageously, the customers are selected for a DR program based on their confidence scores, which, as described herein, indicates a likelihood that the customer will participate in the DR program and/or the impact the customer will have when participating in the DR program.

Figure 9:
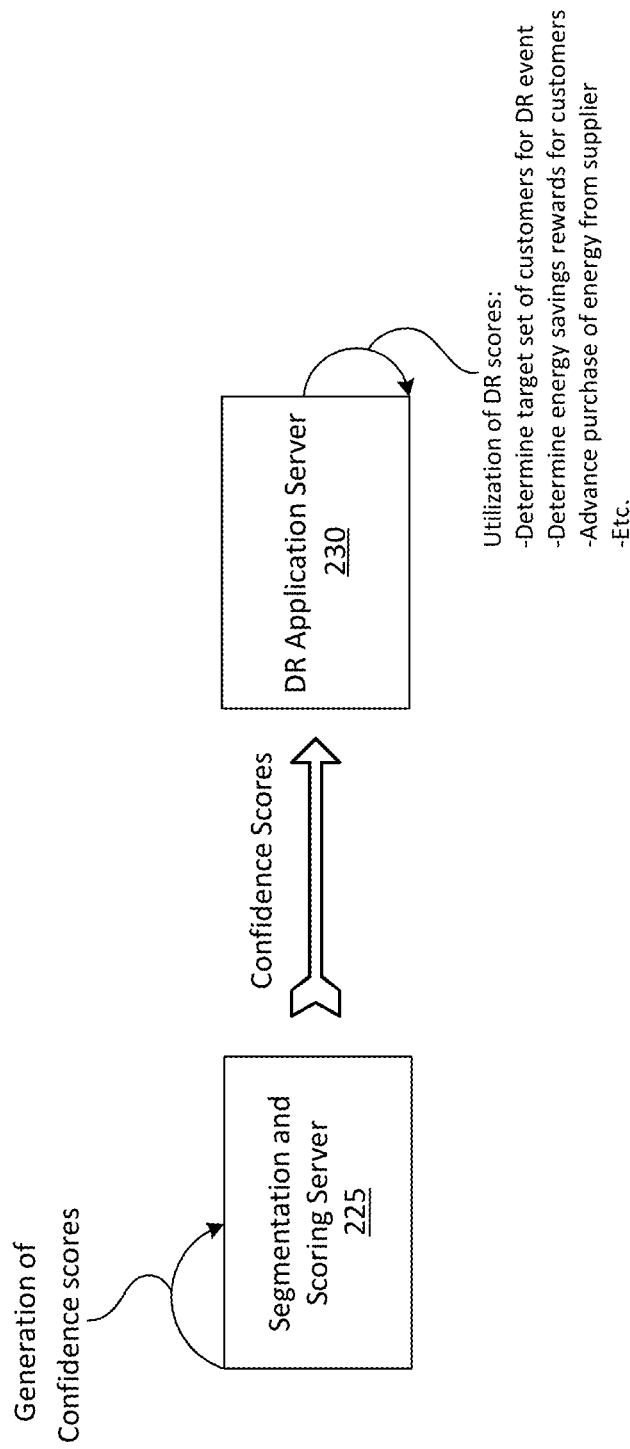
FIG. 9 shows an example implementation for utilizing confidence scores to maximize energy savings in accordance with aspects of the present invention.

FIG. 9 shows an example implementation for utilizing confidence scores to maximize energy savings in accordance with aspects of the present invention. As shown in FIG. 9, the segmentation and scoring server 225 may generate confidence scores, e.g., in accordance with the processes discussed above. The segmentation and scoring server 225 may output the confidence scores to the DR application server 230. Based on receiving the confidence scores, the DR application server 230 may process or utilize the confidence score to select a target set of customers for a DR program (e.g., by selecting a group of customers whose confidence scores that satisfy a threshold). In embodiments, the DR application server 230 may send messages to notify the selected customers of a DR program. In embodiments, the DR application server 230 may determine energy savings rewards for customers based on their confidence scores. For example, the energy savings rewards may be energy credits per unit of energy saved by the customer. In embodiments, the message sent by the DR application server 230 may indicate these rewards to the selected customers. In embodiments, the DR application server 230 may make other decisions based on the confidence scores. For example, the DR application server 230 may determine that a utility provider should make an advance purchase of energy from an energy supplier at a spot price in anticipation of a DR program (e.g., a DR program that is implemented to curb energy costs at peak times, or during particular events).

In an alternative embodiment, the DR application server 230 may use the confidence scores to determine the most effective means to supply energy to the customers. For example, a particular customer may be associated with different feeders and transformers. The confidence scores of the parent transformers and feeders may be used to identify alternate routes when supplying the customer with electricity (e.g., electricity can be supplied to the customer using feeders and transformers having lower power loss ratios, cost per unit, etc.).

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for determining the effectiveness of a DR program and selecting a group of customers who would have the most impact on the DR program, via a network. In this case, a computer infrastructure, such as server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device and using an application program interface (API), analytics data at a feeder level of a utility transmission and distribution system;
generating, by the computing device, a confidence score for a feeder based on the analytics data at the feeder level;
receiving, by the computing device using the API, analytics data at a transformer level of the utility transmission and distribution system;
generating, by the computing device, a confidence score for a transformer associated with the feeder based on the analytics data at the transformer level and the confidence score of the feeder;
receiving, by the computing device using the API, analytics data for customers associated with the transformer;
generating, by the computing device, confidence scores for the customers based on the analytics data and the confidence score of the transformer;
determining, by the computing device, an effectiveness of a demand response (DR) program based on the confidence scores, wherein the DR program is an energy savings event for utility load management;
purchasing energy based on the confidence scores; and
outputting, by the computing device, information regarding the confidence scores and the effectiveness of the DR program,
wherein the confidence scores of the customers indicate an estimated amount of energy saved by the customers during the DR program, and
wherein the confidence scores of the feeder and the transformer indicate a potential cost savings for reducing energy transmitted via the feeder or transformer and the effectiveness of the DR program indicates energy and costs saved by the DR program, the method further comprising using the confidence scores to perform all of:
selecting a target set of customers for a future DR program;
providing energy savings rewards; and
adjusting energy supplying techniques and energy supplying routes.

2. The method of claim 1, further comprising selecting a group of customers for participation in the DR program based on the confidence scores of the customers.

3. The method of claim 2, further comprising sending a message to the selected customers to notify the selected customers of the DR program.

4. The method of claim 1, further comprising determining, based on the confidence scores of the customers, rewards for reducing energy consumption.

5. The method of claim 1, further comprising determining energy supply purchasing based on the confidence scores of the feeder, transformer, or the customers.

6. The method of claim 1, further comprising:
segmenting a plurality of feeders into clusters based on analytics factors for the feeders; and
segmenting a plurality of transformers into clusters based on analytics factors for the transformers,
wherein the feeder is included in a selected cluster of feeders and the transformer is included in a selected cluster of transformers, and
the generating the confidence scores for the customers is based on the segmenting the plurality of feeders and the plurality of transformers into clusters.

7. The method of claim 1, wherein the analytics data for the feeder or transformer includes at least one of:
cost per unit of energy;
estimated revenue per customer category;
transmission power loss ratios;
load balancing data; and
historical demand response program participation data.

8. The method of claim 1, wherein the customer analytics data includes at least one of:
number of incomes for in a customer household;
total customer family income;
number of family members in a customer household;
customer profession;
customer category or type;
customer interests;
number of appliances owned by a customer;
historical customer DR program participation or rating;
customer net energy metering (NEM) rating;
customer registration status in participating in DR programs;
customer participation environmental conservation programs; and
customer participation in third party promotional programs.

9. The method of claim 1, wherein the generating the customer confidence scores is based on ensemble modeling techniques.

10. The method of claim 1, wherein a utility service provider at least one of creates, maintains, deploys and supports the computing device.

11. The method of claim 1, further comprising deploying a system for determining effectiveness of DR programs and selecting a group of customers for participation in a DR program, comprising providing a computer infrastructure operable to perform the steps of claim 1.

12. The method of claim 11, wherein the customer analytics data includes:
number of incomes for in a customer household;
total customer family income;
number of family members in a customer household;
customer profession;
customer category or type;
customer interests;
number of appliances owned by a customer;
historical customer DR program participation or rating;
customer net energy metering (NEM) rating;
customer registration status in participating in DR programs;
customer participation environmental conservation programs; and
customer participation in third party promotional programs.

13. The method of claim 12, further comprising:
generating, by the computing device, an impact on the DR program in view of the customers participating in the DR program based on the confidence scores for the customers; and
generating, by the computing device, energy and cost savings in view of the impact.

14. A computer program product for determining an effectiveness of a demand response (DR) program, the computer program product comprising a computer readable storage medium having program instructions embodied therewith, the program instructions executable by a computing device to cause the computing device to:

determine an effectiveness of the demand response (DR) program based on analytics information of a hierarchy of a utility transmission and distribution system, and analytics information of customers associated with the utility transmission and distribution system, wherein the analytics information of the hierarchy of a utility transmission and distribution system and the analytics information of the customers is obtained using an application program interface (API), wherein the DR program is an energy savings event for utility load management;

determine confidence scores of the customers based on the analytics information of the hierarchy of a utility transmission and distribution system and the analytics information of the customers associated with the utility transmission and distribution system;

identify alternate routes for supplying the customers with electricity by using the confidence scores of the customers to identify feeders and transformers having lower power loss ratios and cost per unit in supplying electricity to the customers;

purchase energy based on the confidence scores; and determine and select a target set of customers for which to select to participate in the DR program;

wherein the confidence scores of the customers indicate an estimated amount of energy saved by the customers during the DR program.

15. The computer program product of claim 14, wherein the analytics information of the hierarchy indicates a potential cost savings for reducing energy transmitted via the utility transmission and distribution system.

16. The computer program product of claim 14, wherein the program instructions further cause the computing device to send a message to the target set of customers to notify the target set of customers of the DR program.

17. The computer program product of claim 14, wherein the program instructions further cause the computing device to determine, based on the confidence scores of the customers, rewards for reducing energy consumption.

18. A system comprising:

a CPU, a computer readable memory and a computer readable storage medium associated with a computing device;

program instructions to receive information regarding confidence scores associated with a feeder, a transformer associated with the feeder, and customers associated with the transformer, wherein the confidence scores for the transformer is based on the confidence scores for the feeder, and the confidence scores of the customers are based on the confidence score for the transformers, wherein the information is received via an application programming interface (API);

program instructions to purchase energy based on the confidence scores;

program instructions to identify alternate routes for supplying the customers with electricity by using the confidence scores of the customers to identify feeders and transformers having lower power loss ratios and cost per unit in supplying electricity to the customers;

program instructions to select a particular group of the customers for participation in a demand response (DR) program based on the confidence scores of the customers, wherein the DR program is an energy savings event for utility load management;

program instructions to determine and provide rewards for the customers as part of the DR program;

program instructions to implement the DR program based on the confidence scores of the customers; and program instructions to output a message to the group of customers to notify the customers regarding the selection of the group of customers for the participation in the DR program;

wherein the confidence scores of the customers indicate an estimated amount of energy saved by the customers during the DR program, and wherein the program instructions are stored on the computer readable storage medium for execution by the CPU via the computer readable memory.

19. The system of claim 18, further comprising: program instructions to determine potentially an estimated amount of energy to purchase based on the confidence scores of the feeder, the transformer, or the customers.

* * * * *